United States Patent

[11] 3,617,782

| [72] | Inventors | Hideteru Nakamura;<br>Moriyoshi Sakamoto; Hiroyuki Kitamura,<br>all of Yokohama-shi, Japan |
|---|---|---|
| [21] | Appl. No. | 3,462 |
| [22] | Filed | Jan. 16, 1970 |
| [45] | Patented | Nov. 2, 1971 |
| [73] | Assignee | Tokyo Shibaura Denki Kabushiki Kaisha<br>(also known as Tokyo Shibaura Electric<br>Co., Ltd.)<br>Kanagawa-ken, Japan |
| [32] | Priorities | Jan. 20, 1969 |
| [33] | | Japan |
| [31] | | 44/3405;<br>Jan. 20, 1969, Japan, No. 44/3406; Jan. 20, 1969, Japan, No. 44/3407 |

[54] SYNCHRONOUS MACHINE PROVIDED WITH LIQUID-COOLED COMB-SHAPED ROTOR
3 Claims, 6 Drawing Figs.

[52] U.S. Cl. ................................................. 310/61, 310/263
[51] Int. Cl. ................................................... H02k 9/00, H02k 1/22
[50] Field of Search ...................................... 310/58–61, 63, 65, 262, 263

[56] References Cited
UNITED STATES PATENTS

| 686,856 | 11/1901 | Langdon-Davies et al. | 310/61 |
| 2,381,122 | 8/1945 | Fechheimer | 310/61 |
| 2,965,777 | 12/1960 | Jaeschke | 310/61 X |
| 2,987,637 | 6/1961 | Bertsche et al. | 310/263 X |
| 3,049,633 | 8/1962 | Cain | 310/61 X |
| 3,051,859 | 8/1962 | Farrell | 310/263 X |
| 3,056,055 | 9/1962 | Willyoung et al. | 310/61 |
| 3,319,100 | 5/1967 | Erickson | 310/263 X |
| 3,321,652 | 5/1967 | Opel | 310/263 X |

*Primary Examiner*—D. F. Duggan
*Assistant Examiner*—Mark O. Budd
*Attorneys*—Robert E. Burns and Emmanuel J. Lobato

ABSTRACT: A synchronous machine provided with a comb-shaped pole-type rotor which includes ducts in the rotor for passage of cooling liquid therethrough. There are provided wedge members of nonmagnetic material, each of which is welded at the side edges thereof to sidewalls of the adjacent pole pieces of the rotor whereby an airgap of the machine is prevented from leaking the cooling liquid thereinto.

SYNCHRONOUS MACHINE PROVIDED WITH LIQUID-COOLED COMB-SHAPED ROTOR

BACKGROUND OF THE INVENTION

The present invention relates to a dynamoelectric machine and particularly to a synchronous machine having an improved liquid-cooled, comb-shaped, pole-type rotor.

As is well known, attempts are being made to use such synchronous machines broadly in various industrial fields, for example, as driving motors for electric automobiles, electric trains machine tools and mills, as well as alternators for automobiles. This has been as a result of a solid rotor construction of the machine structure of the rotor which allows the machine to operate with higher rotational speeds.

However, in such high-speed machines, it is necessary to make the comb-shaped pole-type rotor small in size and weight without any reduction in the electrical and mechanical efficiencies. To achieve this end, it is preferable to provide direct liquid cooling means for the rotors of these machines. In this case, it is necessary to provide a suitable arrangement for preventing the cooling liquid from leaking into the airgap of the machine through an extremely small clearance which may be formed in a portion of the rotor during the manufacturing process of the machine. The cooling liquid entering into the airgap with cause unfavorable larger friction losses therein and prevent smooth rotation of the rotor.

SUMMARY OF THE INVENTION

It is, therefore, an object of the invention to provide a synchronous machine having an improved comb-shaped pole-type rotor with liquid cooling means, in which the above described defects can be effectively eliminated, and having the features of small size and low weight as well as the capability of operating at high speed with high efficiency. The synchrous machine of the invention has a rotor shaft about which are disposed two comb-shaped pole elements each having two diametrically opposed pole pieces defining an axial recess into which are inserted two other pole pieces circumferentially of the shaft. A wedge-shaped spacer locks the pole elements into an integral assembly.

The central portion of the rotor has a major diameter and has two sets of radial ducts connecting two axial ducts in the shaft with axial ducts in the pole elements, in the central region of the rotor. Some ducts are disposed in the gaps between the pole elements mentioned above and these are connected by two sets of radial ducts to the ducts in the shaft.

The ducts in the gaps are precluded from leaking cooling liquid to the exterior of the rotor by spaces between the next adjacent pole pieces that effect fluidtight seals therebetween.

DETAILED DESCRIPTION OF THE PRESENT INVENTION

Figure 1:
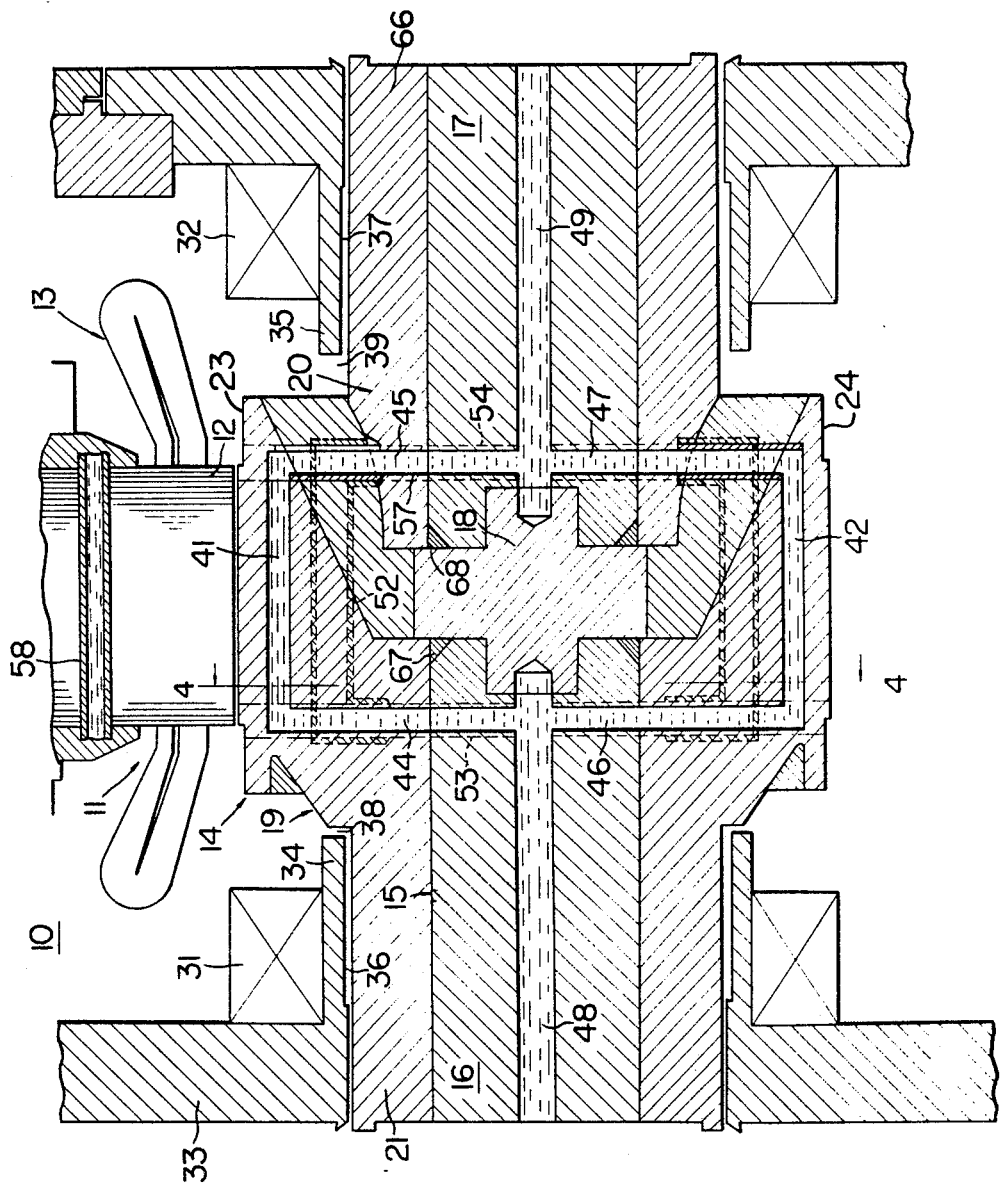
FIG. 1 is a fragmentary view, in section, of a dynamoelectric machine embodying the present invention.

Referring now to FIG. 1, a dynamoelectric machine, such as, for example an electric synchronous motor is generally designated by reference numeral 10. The motor comprises a stator assembly 11, including a laminated stator core 12 and a polyphase winding 13 wound in slots of the stator core, and a rotor assembly 14 rotatably mounted in a bore of the stator core.

The rotor assembly 14 includes a shaft member 15 which has a pair of axially separated shaft pieces 16 and 17 made of magnetic material. A coupling member 18 made of nonmagnetic material is provided between the ends of the shaft pieces for securely engaging both pieces therethrough. The coupling member 18 serves to interrupt magnetic flux which may be passed through a space between the adjacent end surfaces of the shaft pieces. The shaft member 15 can also be assembled by welding the end surfaces of the shaft pieces with the coupling member as indicated by reference numerals 67 and 68.

Figure 2:
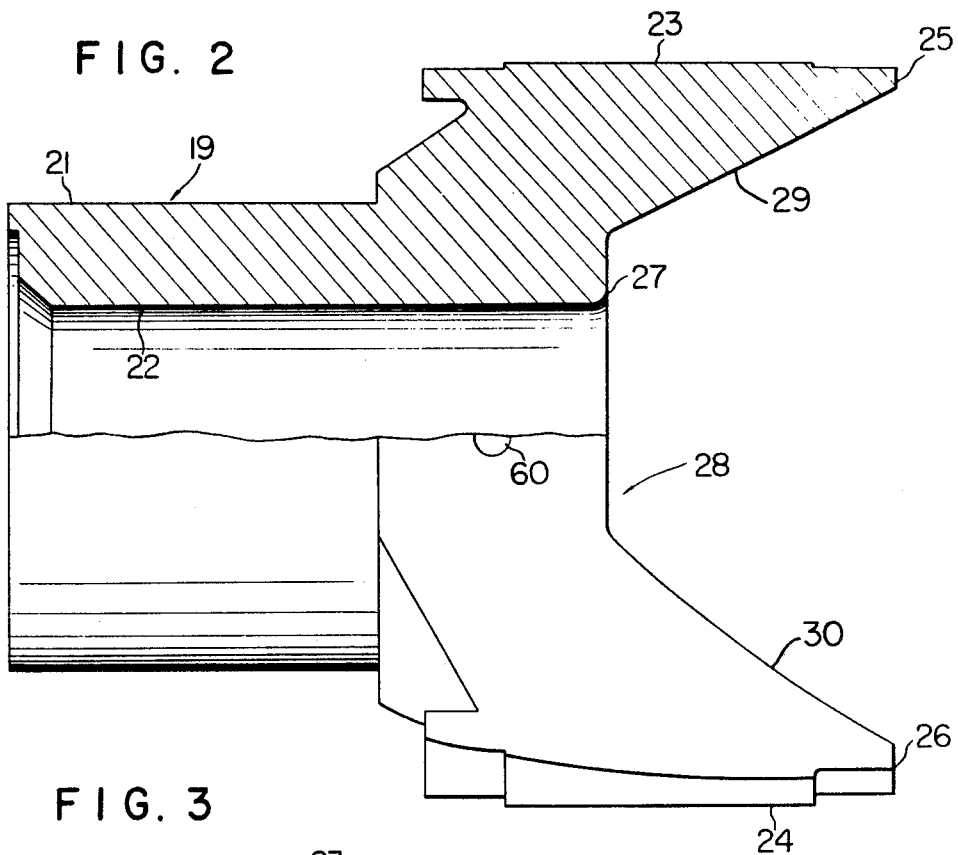
FIG. 2 is a side view, in section, of one of the comb-shaped magnetic pole members utilized in the machine shown in FIG. 1.
Figure 3:
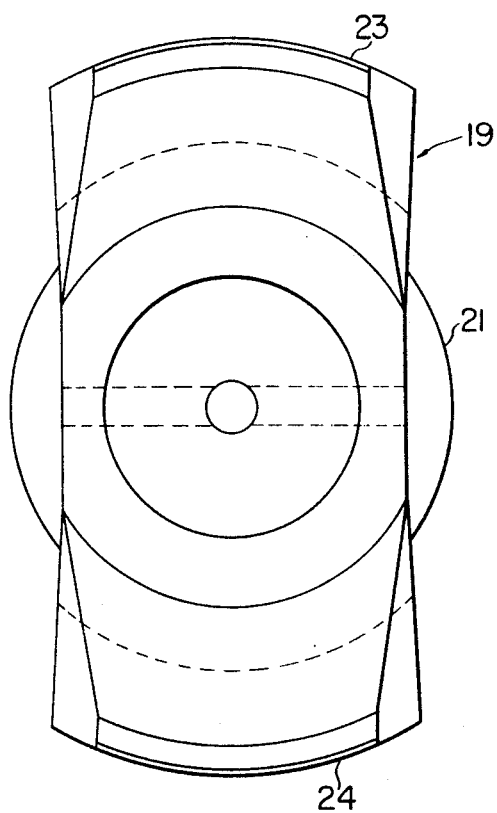
FIG. 3 shows a front view of the pole member of FIG. 2.

There are provided a pair of comb-shaped magnetic pole members 19 and 20 securely fitted around the shaft member 15 by any suitable means, for example, either shrinkage fit or a combination of key and slot. One of the comb-shaped magnetic pole members 19 is shown in FIGS. 2 and 3. However, since the other has the same construction as that of the member 19, the description thereof with reference to the drawing is omitted. The pole member includes a cylindrical portion or boss 21 which has an axial opening 22 through which the shaft member 15 extends and is fixed therewith as described above. Further, the pole member 19 also includes a pair of axially extending magnetic pole pieces 23 and 24 integrally provided therewith. The pair of magnetic pole pieces are located at opposite sides along one of the diameters of the pole member 19 and make two magnetic poles having the same polarities as mentioned hereinbelow.

As clearly shown in FIG. 2, the axial ends 25 and 26 of the pole pieces 23 and 24 are positioned sufficiently away from the end surface 27 of the boss 21 so that there is provided a relatively large axial recess 28 defined by the inner surfaces 29 and 30 of the pole pieces 23 and 24 as well as the end surface 27 of the boss 21. As described above, the other pole member has the same construction as that of the pole member 19, and the same is mounted on the shaft member in a manner similar to that of the member 19. In this case, the pole pieces of the other pole member are positioned between pole pieces 23 and 24 and engaged therewith.

Thus, the assembled rotor is shown in FIG. 1. In FIG. 1, it can be easily understood that the coupling member 18, which forms a part of the shaft member 15, functions as a magnetic separation or insulation between the pair of pole members 19 and 20, and the bottom portion 27 of the recess 28, that is, one end of boss 21 engages with the flanged portion of the coupling member 18 to position the pole member exactly on the shaft member.

Referring again to FIG. 1, there are provided a pair of DC exciting coils 31 and 32 on a stator frame 33 so that the bosses 21 and 66 of the pole members 19 and 20 are surrounded by the coils. The coils are positioned around cylindrical members 34 and 35 which axially extend from the inner walls of the stator frame to the center portion of the machine, respectively. There are also provided relatively small airgaps 36 and 37 between the inner surfaces of the cylindrical members and the peripheries of the boss portions of the comb-shaped pole members, respectively. It can be seen that the axially innermost ends of the cylindrical members 34 and 35 terminate adjacent to the shoulder portions of the pole members through small axial airgaps 38 and 39, respectively, as shown.

Thus, when the coils 31 and 32 are energized from any suitable DC exciting source (not shown), the magnetic flux generated by the coil 31 flows through a path which includes the stator frame 33, cylindrical member 34, airgaps 36 and 38, boss portion 21, a set of comb-shaped pole pieces 23 and 24 and the stator core 12. Similarly, magnetic flux generated by the coil 32 flows through another path which includes stator frame 33, stator core 12, another set of comb-shaped pole pieces of another pole member 20, the boss portion of member 20, airgaps 37 and 39 and cylindrical member 35. In this case, the fluxes may or may not flow through the shaft members 16 and 17.

In this manner, the pair of pole pieces 23 and 24 of the pole member 19 are excited to have one polarity, for example north, and the others of pole member 20 have the other polarity, south. Accordingly, it can be easily understood that the four pole pieces of the rotor assembly 14 make alternatively north and south polarities.

Figure 4:
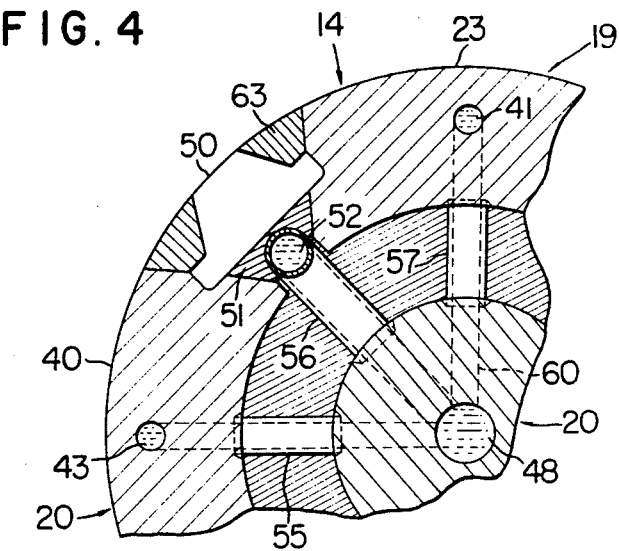
FIG. 4 is a sectional view, with a part broken away, taken along line 4—4 of FIG. 1 and viewed in the direction of the arrow.

In FIG. 4, there are shown a pair of adjacent pole pieces 23 and 40 of members 19 and 20. The pole pieces 23 and 24 have axially extending cooling ducts 41 and 43 therein for passing the cooling medium therethrough, for example such as an electric insulating oil or water. In FIG. 1, there are shown cooling ducts 41 and 42 provided in the pole pieces 23 and 24 of the pole member 19. These ducts communicate with radial ducts 41 and 42 44, 45, 46 and 47 which are arranged in the opposite side portions of the rotor body, and the radial ducts also communicate with respective ends of the other ducts 48 and 49 which are arranged in and extend through the shaft pieces 16 and 17 respectively.

The other end of the axial duct 48 is connected to any suitable cooling medium source through rotatable seal means and pumping means serially connected thereto, whereas the other end of the axial duct 49 is connected to a liquid-return passage which can communicate with the cooling liquid source through fluidtight sealing means which is rotatable relative to the shaft piece 17. Thus, the rotor 14 can be cooled by liquid which flows through and is pumped through the ducts of the rotor during its operation.

As can be seen in FIG. 4, there is provided a wedge 50, made of nonmagnetic material such as stainless steel or bronze, between adjacent sidewalls of pole pieces 23 and 40 by welding thereto as shown with 63. Thus, there is made a space 51 for enclosing a cooling pipe 52, and the same is defined by the inner surface of the wedge and adjacent sidewalls of sequential pole pieces 19 and 40. The opposite ends of the pipe 52 are connected to one end of radial ducts 53 and 54 provided in the opposite side portions of the rotor body. The other ends of the radial ducts 53 and 54 are open to the ducts 48 and 49 arranged in the shaft pieces 16 and 17 in a similar manner to those of the ducts 44 and 45.

As there will be seen in FIGS. 1 and 4, each of the ducts must extend between the pole magnetic members respectively having different polarities. Accordingly, means for interrupting the magnetic flux which passes through the intermediate connecting portion of the duct are required. To this end, the ducts 55, 56 and 57 which extend between the separate pole members are preferably made of a pipe of nonmagnetic material such as for example, aluminum stainless steel and bronze.

The rotor assembly 14 constructed in this manner is filled in the various spaces or clearances thereof with suitable materials having good heat conductivities, which materials are suitably selected from, for example, aluminum and resinous materials including metal-powdered fillers which have desirable heat conductivity. In the disclosed preferable embodiments, all of the spaces or clearances of the rotor assembly 14 are filled with aluminum diecasting.

Thus, it can be seen that there is provided a desired rigidity sufficient to prevent destruction of the rotor assembly during its operation because all of the parts of the rotor assembly are integrally formed with aluminum diecasting. Furthermore, the heat generated in the pole pieces and wedges during the operation of the synchronous machine is effectively removed by the liquid flowing through the ducts 41, 43 and 52. It will be apparent that because the wedge provides a fluidtight seal between adjacent pole pieces, the cooling liquid can not leak into the airgap and thus the rotor can rotate at a desired high speed without any friction loss in the airgap.

In an actual high-speed machine such as for example, a driving motor of an automobile, if a slight liquid leakage in the airgap occurs, an extremely greater friction loss will occur therein, whereby it will be impossible to continue the driving of the car. In accordance with the invention as described above, such malfunctioning can be easily eliminated by the wedge member welded between the adjacent comb-shaped pole pieces to fluid-tightly close the opening between the adjacent pole pieces.

Furthermore, it can be seen that all of the cooling ducts which cause the cooling liquid to flow there through are embedded within the rotor body having the spaces filled with cast alluminium. In this manner, in accordance with the invention it is possible to design liquid-cooled synchronous machines of smaller dimensions, lower weight, and less manufacturing costs than the prior machines, and further to provide machines of higher reliability. Further, in accordance with the particular design of the rotor assembly which uses the wedges and fillers made of nonmagnetic material respectively, magnetic short-circuiting between the pole pieces having different polarities and between the axially separated comb-shaped pole members will not occur.

Referring again to FIG. 1, the above-described effects of the present invention will be effectively enhanced by arranging axial cooling ducts 58 within the stator to flow cooling liquid therethrough.

Figure 5:
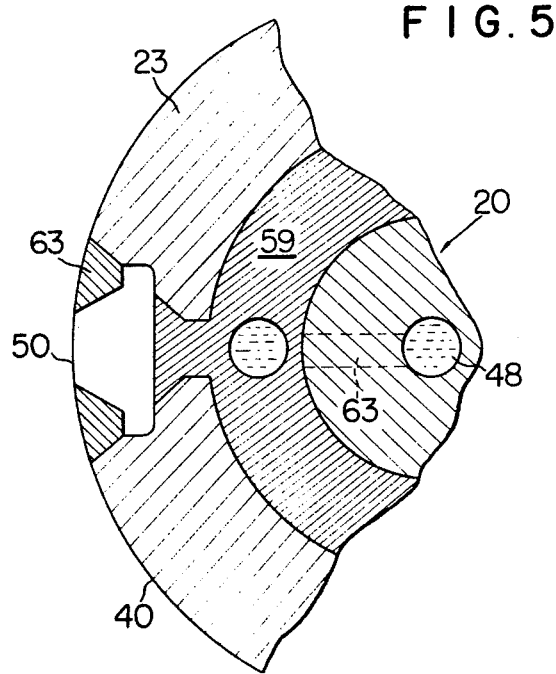
FIG. 5 is a sectional view, similar to FIG. 4, of another embodiment of the present invention.
Figure 6:
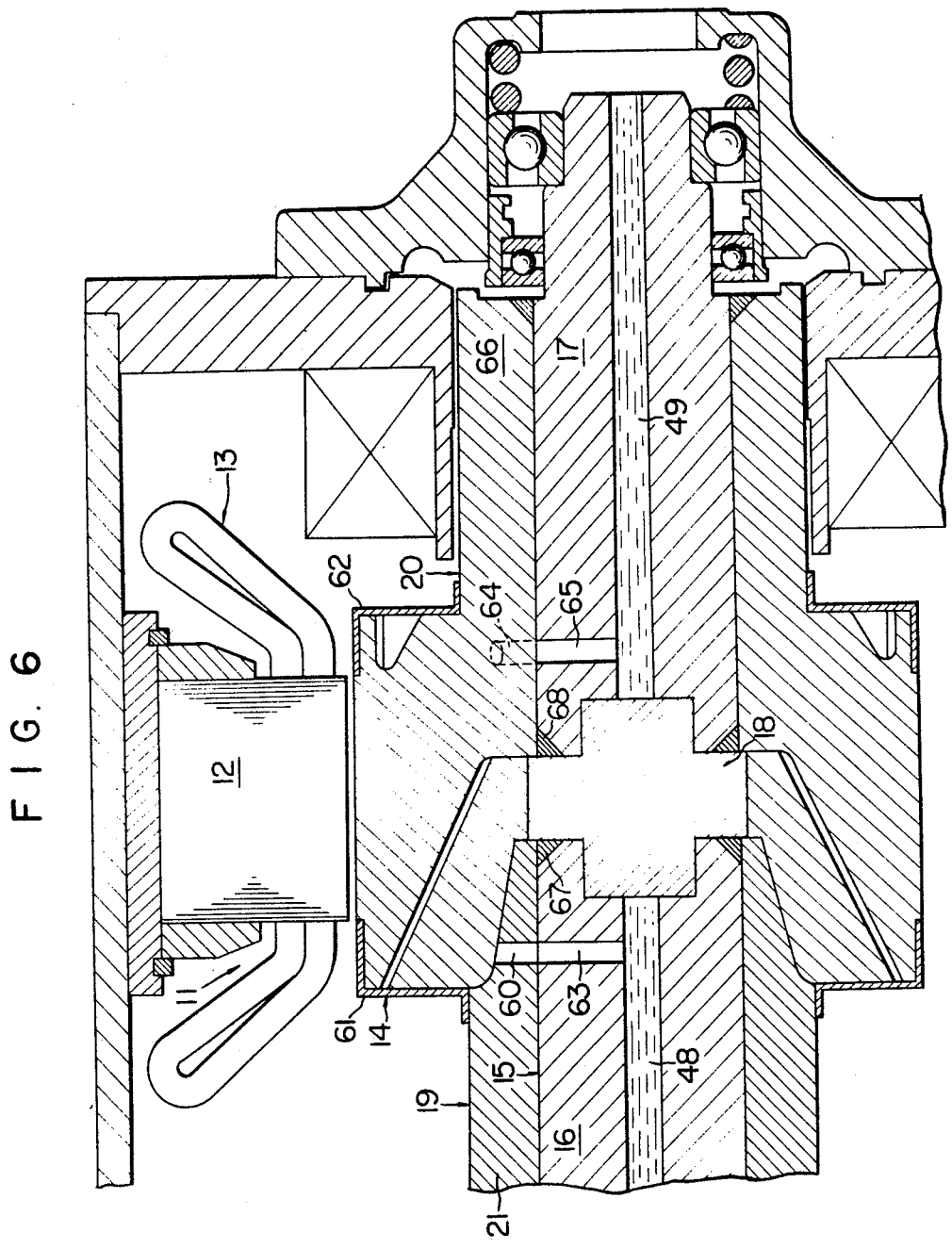
FIG. 6 is a longitudinal sectional view of the machine, partly broken away, wherein the rotor shown in FIG. 5 is employed.

In another embodiment as shown in FIGS. 5 and 6, in which parts similar to those of FIGS. 1 to 4 are designated by the same reference numerals, there is provided a cooling liquid path or duct 59 which is defined by the inner surfaces of the comb-shaped pole pieces 23 and 40, the inner surfaces of the wedge members 50 and the outer surfaces of the boss portions of the comb-shaped pole members 19 and 20. The cooling liquid may be supplied into and be exhausted from the duct 59 through radial ducts 60 and 63 which are arranged within the boss 21 of the magnetic pole member 19 and the shaft piece 16 and communicate with the axial duct 48 extending through the shaft piece 16. Similarly, the cooling liquid may also be supplied into and be exhausted from the duct 59 through other radial ducts 64 and 65 which are arranged within the boss 66 of the magnetic pole member 20 and the shaft member 17 and communicate with the axial duct 49 extending through the shaft member 17. Accordingly, the faced ends of the axial ducts 48 and 49 are interrupted by the coupling member 18.

In this case, the opposite ends of duct 59 are liquid-tight covered with the cover plates 61 and 62, which are made of nonmagnetic material such as, for example, stainless steel, and welded to the side portions of the comb-shaped pole pieces, wedges and the welded fillers 63 (FIG. 5) made of stainless steel, for example. It will be therefore apparent that it is possible to provide a directly cooled comb-shaped pole type rotor without any leakage of the cooling liquid, whereby the dimension of the synchronous motor can be effectively miniaturized.

As is well known, the stator winding of a machine as disclosed hereinabove is usually energized from the output of a polyphase inverter or a polyphase chopper which may be formed by using a plurality of thyristors controlled by electrical signals which can be generated from an angular position detector mounted on an extension of the motor shaft.

Further, it will be apparent that the disclosed synchronous machine can also be applied to AC generators, for example, for car use. While the invention has been described above with respect to only examples of four-pole machines, the invention is not limited thereto, it being possible to use any number of poles in the practice of the invention.

We claim:

1. A compact synchronous machine comprising, a stator having an axial bore, an integrally assembled rotor rotatable in said bore comprising, a rotor shaft having means therein to preclude a magnetic path along the full axial length thereof, two magnetic pole members circumferentially spaced disposed circumferentially of a part of said shaft each having a comb-shaped portion of larger diameter and an axial extension of lesser diameter, the comb-shaped portions having two diametrically opposed pole pieces defining a central portion of said rotor having an axial recess therein, two other magnetic pole pieces extending axially of said shaft circumferentially thereof and extending axially into said axial recess, spacer means axially between the other magnetic pole pieces and the magnetic pole pieces defining said axial recess, means on said stator disposed axially spaced relative to said rotor and circumferentially of said axial extensions of said two pole members and said other pole pieces defining airgaps with the pole members and the pole pieces, for each airgap a direct current exciting coil circumferentially of each of said rotor means, and stator windings disposed about a part of said central portion of said rotor, said axial recess having a taper in one axial direction and said spacer means being wedge-shaped disposed in said axial recess joining the magnetic pole pieces in assembly, said rotor shaft having two axially spaced axial ducts each extending axially and terminating in the vicinity of said central portion of said rotor, each of the comb-shaped portions having an axial duct in the two pole pieces thereof, the shaft, spacer means and other pole pieces jointly defining two sets of ducts in the central portion of said rotor extending radially providing communication between opposite ends of the axial ducts in the comb-shaped portions and the two axial ducts in the shaft, and in operation all of said ducts containing a cooling liquid pumped into one of the axial ducts in the shaft and discharged through the other axial duct in the shaft.

2. A compact synchronous machine according to claim 1, in which said rotor shaft comprises two axially spaced shaft portions, and a nonmagnetic spacer between said shaft portions connecting said shaft portions comprising said means to preclude said magnetic path.

3. A compact synchronous machine according to claim 1, in which said comb-shaped pole members define gaps extending in a circumferential direction between next adjacent pole pieces thereof, a spacer in each gap extending between the pole pieces making a liquid-tight seal therebetween, and duct means extending axially in each gap for containing a cooling liquid therein, and said shaft, first-mentioned spacer means and other pole pieces jointly defining two sets of radial ducts axially spaced from each other connecting opposite ends of the ducts in said gaps with respective ones of the axial ducts in said shaft.

* * * * *